(12) United States Patent
Hirayama et al.

(10) Patent No.: US 6,409,113 B1
(45) Date of Patent: Jun. 25, 2002

(54) DUAL-BEARING REEL BODY

(75) Inventors: Hirokazu Hirayama, Sakai; Tomoharu Sakurai, Wakayama, both of (JP)

(73) Assignee: Shimano Inc., Osaka (JP)

( * ) Notice: Subject to any disclaimer, the term of this patent is extended or adjusted under 35 U.S.C. 154(b) by 65 days.

(21) Appl. No.: 09/709,649

(22) Filed: Nov. 13, 2000

(30) Foreign Application Priority Data

Nov. 19, 1999 (JP) ............................................. 11-330607

(51) Int. Cl.[7] ............................................. A01K 89/015
(52) U.S. Cl. ..................................... 242/310; D22/140
(58) Field of Search ................................. 242/310, 311, 242/312, 313, 314; D22/140, 141

(56) References Cited

U.S. PATENT DOCUMENTS

| | | | | |
|---|---|---|---|---|
| 4,934,628 A | * | 6/1990 | Yamaguchi | 242/223 |
| 4,997,143 A | * | 3/1991 | Grice | 242/311 |
| 5,127,603 A | * | 7/1992 | Morimoto | 242/310 |
| D332,992 S | * | 2/1993 | Mintz | D22/140 |
| 5,370,331 A | * | 12/1994 | Sato | 242/313 |
| 6,254,022 B1 | * | 7/2001 | Katayama | 242/310 |
| D448,445 S | * | 9/2001 | Sakurai et al. | D22/140 |

* cited by examiner

*Primary Examiner*—Emmanuel M. Marcelo
(74) *Attorney, Agent, or Firm*—Shinjyu Global IP Counselors, LLP

(57) ABSTRACT

Dual-bearing reel body configured to improve style and decorativeness in the outward appearance of a dual-bearing reel unit having a protruding portion. The dual-bearing reel body (1), having a handle disposed on one side surface and a spool disposed inside the dual-bearing reel unit, includes a frame (5), a pair of side-covers (6) and (7) covering both sides of the frame, and a rod-mounting leg (4) for mounting the fishing rod. The frame (5) includes a pair of side-plates (8) and (9) between which the spool is disposed and connection members (10a) and (10b) for connecting the side-plates (8) and (9). On the side of the reel body (1) on which the handle is mounted, the proximal side-cover (7) and the proximal side-plate (9) form a first cylindrical portion (11a) and a second cylindrical portion (11b) staggered so that it intersects with an outer rim of the first cylindrical portion.

16 Claims, 12 Drawing Sheets

DUAL-BEARING REEL BODY

BACKGROUND OF THE INVENTION

1. Technical Field

The present invention relates to reel units, and in particular, to fishing-rod mounted dual-bearing reel units in which fishing line is wound on a spool that is rotated by turning a handle on the reel.

2. Description of Related Art

Dual-bearing reels include a reel body to be mounted on a fishing rod, a spool disposed inside the reel body, a handle provided on one side of the reel unit, and a rotation transmission mechanism for transmitting rotation of the handle to the spool. The reel body includes a frame and a pair of side-covers. The frame includes a pair of left and right side-plates and connection members connecting the two side-plates, which are covered by the side-covers. The rotation transmission mechanism includes a main gear mounted on the handle shaft and a pinion gear mounted on the spool shaft; enlarging the two gears diametrically improves their rotation transmission efficiency.

Among dual-bearing reels of this kind, round dual-bearing reels are known whose side-plates and side-covers are made of metal and are substantially circular when viewed from the side. With conventional round dual-bearing reels manufactured of metal, the outer peripheral surface is finished by a machining process that serves to improve the style. With the aim of raising the rotation transmission efficiency of the rotation transmission mechanism in these round dual-bearing reels, the spool axis has been set off upward and rearward in the reel unit in order to enlarge the inter-shaft separation between the main gear and the pinion gear. This disposes the handle axis and the spool axis approximately on a diameter of the round outward form of the reel body. Nevertheless, with conventional compact round dual-bearing reels, such as disclosed for example in Japanese Reg. Utility Model No. 2552677, there is a limit to the expanding the inter-shaft distance.

A through-hole for inserting and removing the spool is provided in the reel body in round dual-bearing reels of this sort. Therefore, setting the spool axis off beyond a certain degree would make the thickness between the portion in which the through-hole is formed and the outer peripheral portion flimsy, diminishing the strength of the reel body against impact from being dropped. Moreover, this would put the outer circumference of the spool too close to the outer peripheral side of the reel body and to the clutch operating device, making it difficult to perform pitching and to operate the clutch.

In order to prevent this, dual-bearing reels are known in which the side-cover on the side where the handle is mounted protrudes axially as well as diametrically outward. Usually the protruding portion, which is roughly rectangular when viewed laterally, is formed stepped off beneath the rest so that it can accommodate the larger-diameter main gear mounted on the handle shaft. Furnishing the protruding portion in this manner keeps the strength from diminishing and keeps the reel from being awkward to operate, and at the same time increases the rotation transmission efficiency.

With conventional dual-bearing reels having the protruding portion, the protrusion sticks out in roughly rectangular form. Therefore, even though the outer circumferential surface of the remaining circular section can be machined by for example a lathe, machining the outer peripheral surface of this protruding portion that is roughly rectangular in prominence is difficult. This means that a machined section and an un-machined section appear on the outer peripheral surface, giving rise to an unnatural disparity from a design standpoint, which degrades the overall style and decorativeness of the reel unit. Moreover, even if the reel body is not machined, the round portion and rectangular portion lend an odd feel to the design, diminishing the style and decorativeness of the reel unit overall.

SUMMARY OF THE INVENTION

An object of the present invention to improve style and decorativeness in dual-bearing reel outward appearance among those in which the reel body has a protruding portion.

According to a first aspect of the present invention, a dual-bearing reel unit to be mounted on a fishing rod has a handle disposed on one side surface of the dual-bearing reel unit and a spool disposed inside the dual-bearing reel unit, and includes a frame, a pair of side-covers and a fishing rod mounting portion. The frame includes a pair of side-plates between which the spool is disposed and a connection member for connecting the side-plates. The pair of side-covers covers the outer side of the two side-plates, and the handle is mounted on a proximal of the pair of side-covers. The fishing rod mounting portion is mounted on the fishing rod between the pair of side-plates. On the side on which the handle is mounted, the proximal side-cover and the proximal side-plate form a first cylindrical portion and a second cylindrical portion. The first cylindrical portion has a cylindrical first space inside, and the second cylindrical portion has a cylindrical second space inside that protrudes outward with respect to the first cylindrical portion in a spool shaft direction and is connected to the cylindrical first space, an outer circumference of the second cylindrical portion being staggered, so that it intersects with an outer circumference of the first cylindrical portion.

In a dual-bearing reel unit thus, a first cylindrical portion and a second cylindrical portion are arranged on the side where the handle is mounted, the first cylindrical portion has a first space, and the second cylindrical portion has a cylindrical second space inside that protrudes outward in a spool shaft direction and is connected to the cylindrical first space, an outer circumference of the second cylindrical portion being staggered, so that it intersects with the first cylindrical portion. That is to say, the side-plate and the side-cover form two staggered cylindrical portions with intersecting outer circumferences. Making the protruding portion with the second cylindrical portion, which protrudes to the outside, it becomes easy to form the outer peripheral surface in a cutting process while increasing the rotation efficiency by providing a protruding portion, and the two cylindrical portions do not impart the odd feel to the design arising in reels with the rectangular protrusion. Thus, the appearance and decorativeness of a dual-bearing reel unit having a protruding portion can be improved.

According to a second aspect of the present invention, in a dual-bearing reel unit as in the first aspect, the outer peripheral surfaces of the two cylindrical portions overlap at least partially in the spool shaft direction. In this case, the outer peripheral surfaces of the two cylindrical portions overlap at least partially, so that the space formed by the first space and the second space in the portion where the two cylindrical portions overlap becomes large with respect to a direction intersecting with the spool shaft, and the main gear and various mechanisms, such as the clutch control mechanism, can be accommodated in a compact fashion without extending the length of the reel in the spool shaft direction. Therefore, the storage space inside the reel unit is increased, and a compact appearance can be achieved.

According to a third aspect of the present invention, in a dual-bearing reel unit as in the first or second aspect, the two cylindrical portions have substantially the same diameter. In this case, the processing of the outer surfaces of the cylindrical portions is easier, because the two cylindrical portions have the same diameter.

According to a fourth aspect of the present invention, in a dual-bearing reel unit as in any of the first to third aspects, the proximal side-cover is positioned with respect to the proximal side-plate by a plurality of positioning members. In this case, the proximal side-cover can be easily centered spanning both rotation shafts of the handle and the spool, because the side-cover and the side-plate are positioned with positioning members.

According to a fifth aspect of the present invention, in a dual-bearing reel unit as in any of the first to fourth aspects, the outer peripheral surface of the frame and the side-covers is made by a cutting process. In this case, the appearance can be improved, because the outer peripheral surface of the entire reel unit is made by a cutting process.

According to a sixth aspect of the present invention, in a dual-bearing reel unit as in any of the first to fifth aspects, the distal side-cover can be opened and closed with respect to the distal side-plate. In this case, since the distal side-cover can be opened and closed, the spool can be removed from a portion where relatively few mechanisms are located, which makes maintenance of the spool easier.

According to a seventh aspect of the present invention, in a dual-bearing reel unit as in any of the first to sixth aspects, a cut-out portion for mounting a gear member that is mounted to an end of a threaded shaft of a level wind mechanism for uniformly winding fishing line on the spool, so as to rotate the threaded shaft, is formed on an outer peripheral surface of the first cylindrical portion, and the dual-bearing reel unit further includes a cover member for covering the gear member, mounted on the first cylindrical portion at the cut-out portion. In this case, it is easy to cut the outer surface of the first cylindrical portion, even when the gear member is provided with a large diameter, for example, so as to wind the fishing line more densely on the spool or to improve the rotation efficiency.

According to an eighth aspect of the present invention, in a dual-bearing reel unit as in any of the first to seventh aspects, the second space accommodates a main gear for transmitting rotation of the handle to the spool, the main gear being mounted on a rotation shaft of the handle, and a pinion gear meshing with the main gear. In this case, the main gear and the pinion gear are disposed in the second space, which is staggered toward the first space, so that the entire reel unit can be made smaller while both gears can be provided with large diameters to increase the efficiency of the rotation transmission, and there is no necessity to shift the spool too far to the side that is opposite from the side that is mounted to the fishing rod.

According to a ninth aspect of the present invention, in a dual-bearing reel unit as in any of the first to eighth aspects, a rotation shaft of the handle is arranged in a portion where the first outer circumference overlaps the second outer circumference. In this case, the main gear and the pinion gear can be provided with large diameters while mounting them on the rotation shaft, because the handle rotation shaft is arranged in a portion where the two outer circumferences overlap.

According to a tenth aspect of the present invention, in a dual-bearing reel unit as in any of the first to ninth aspects, the second outer circumference is staggered with respect to the first outer circumference toward the rotation shaft of the handle. In this case, the main gear can be provided with a large diameter while mounting the main gear on the rotation shaft, because the second outer circumference is shifted toward the rotation shaft of the handle.

According to an eleventh aspect of the present invention, in a dual-bearing reel unit as in any of the first to tenth aspects, the second cylindrical portion is staggered with respect to the first cylindrical portion toward the side where the fishing rod is mounted and toward the side where fishing line is unwound from the spool. In this case, the handle can be operated more efficiently, because the direction in which the second cylindrical portion, to which the handle is mounted, is staggered is downward and toward the front with respect to the first cylindrical portion.

According to a twelfth aspect of the present invention, in a dual-bearing reel unit as in any of the first to eleventh aspects, the two cylindrical portions are covered only by the proximal side-cover. In this case, the structure for covering the two cylindrical portions is simple, because there is only a single proximal side-cover.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Figure 1:
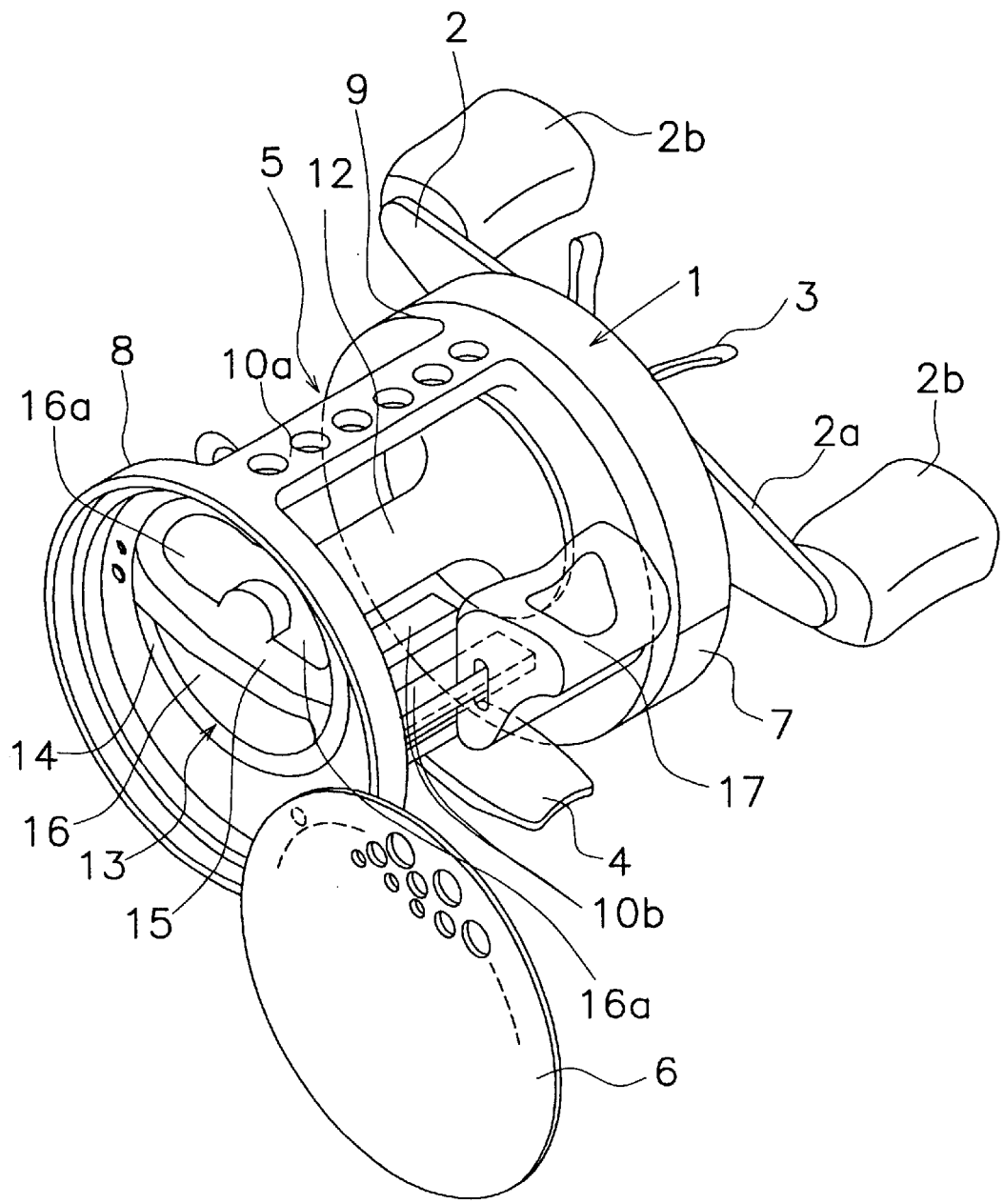
FIG. 1 is an oblique view of a dual-bearing reel in an embodiment of the present invention.
Figure 2:
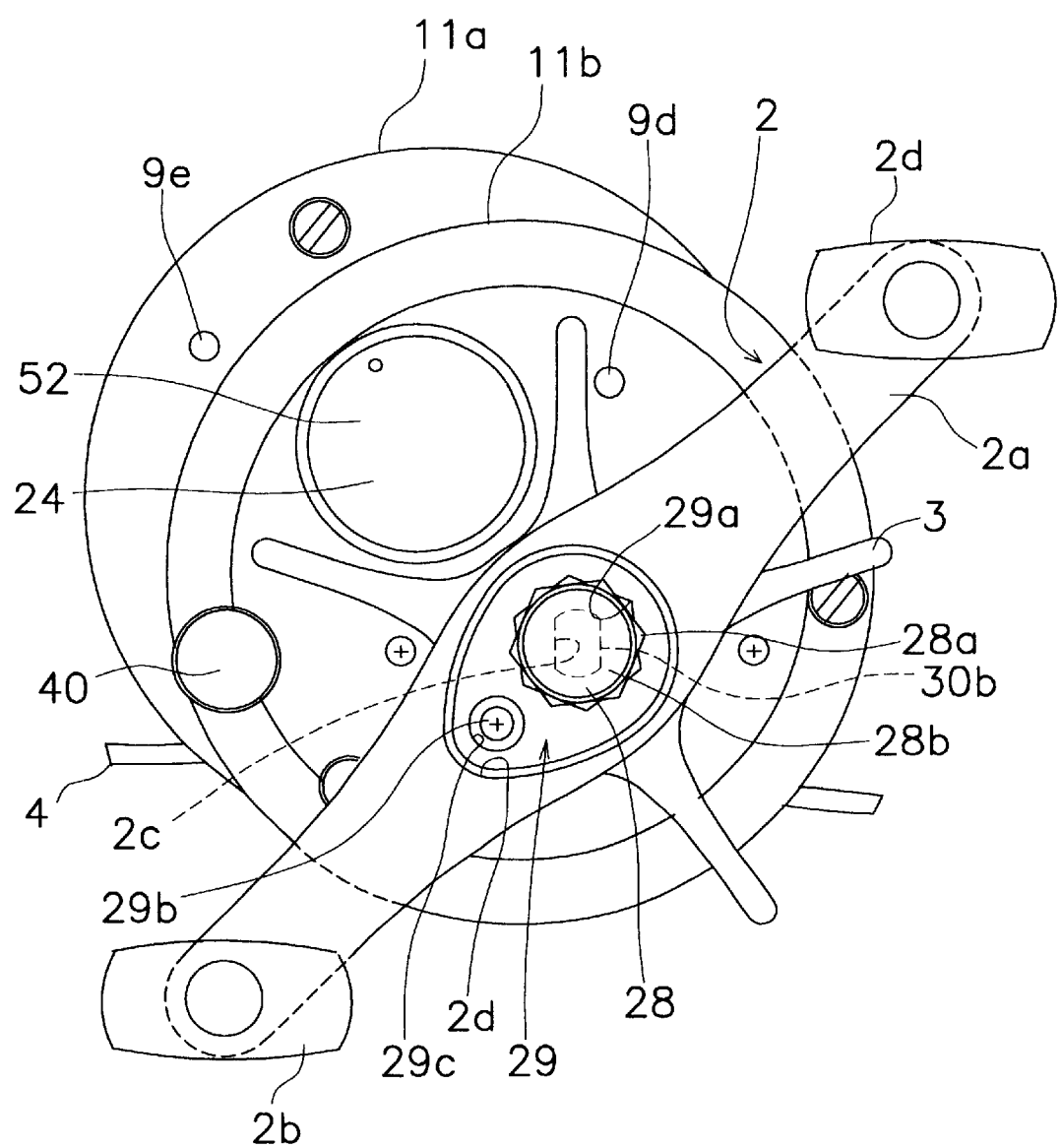
FIG. 2 is a lateral view of the dual-bearing reel in FIG. 1, seen from the left.
Figure 3:
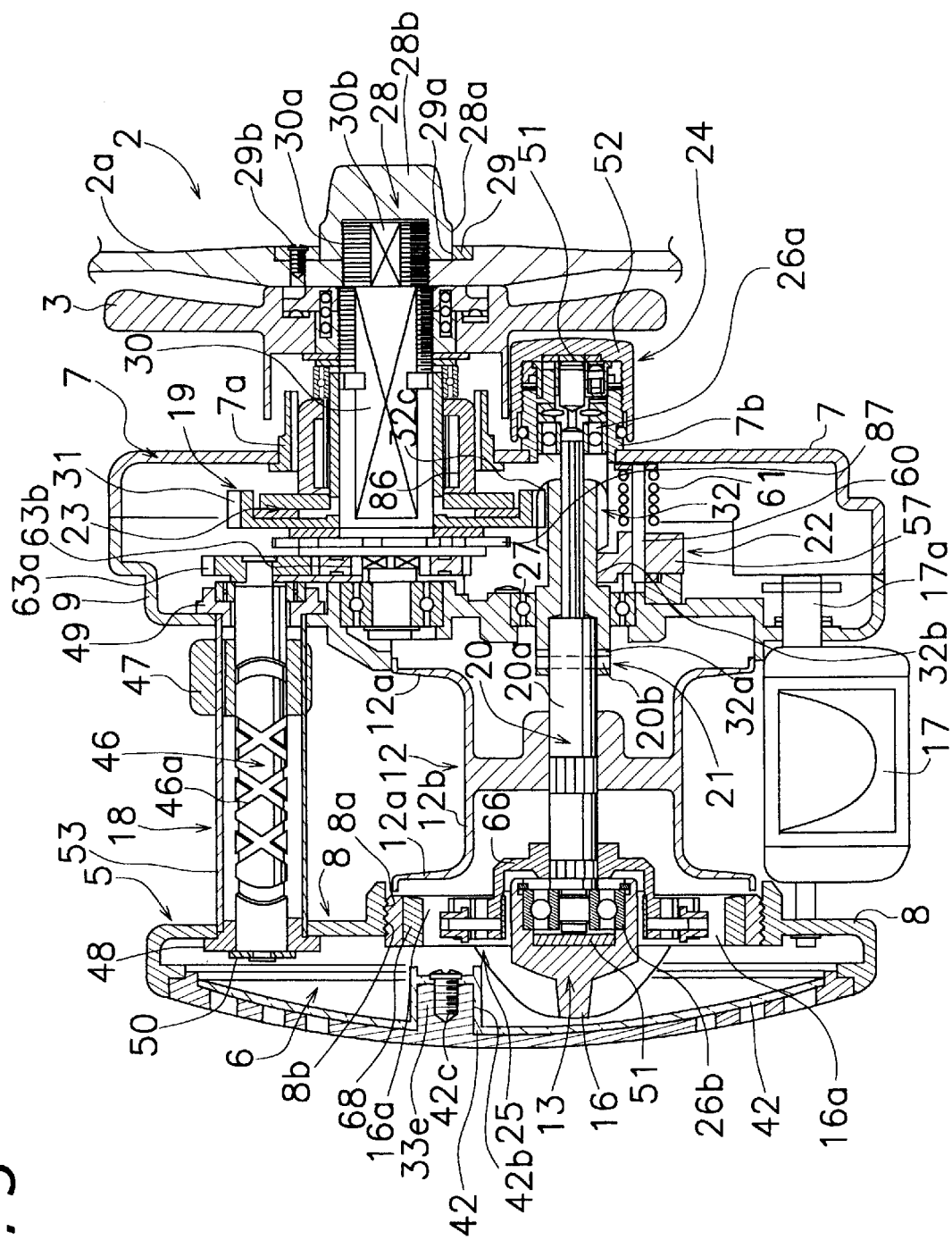
FIG. 3 is a plane sectional view of the dual-bearing reel in FIG. 1.

The dual-bearing reel shown in FIGS. 1 to 3, which is an embodiment of the present invention, is a round dual-bearing reel for bait-casting. This reel includes a reel body 1, a spool-cranking handle 2, and a star drag 3 for adjusting drag. The handle 2 is disposed on one side of the reel body 1. The start drag 3 is disposed on the same side of the reel body 1 as the handle 2.

Configuration of the Handle

The handle 2 is of the double-handle type and has a plate-shaped arm portion 2a and grips 2b that are attached rotatively to both ends of the arm portion 2a. As shown in FIG. 3, the arm portion 2a is mounted non-rotatively to the near end of a handle shaft 30, and is fastened to the handle shaft 30 with a nut 28. The near end of the handle shaft 30 is smaller in diameter than the rest, and an externally threaded portion 30a and parallel beveled portions 30b are formed on its outer peripheral surface. Screwing the nut 28 onto the externally threaded portion 30 fastens the arm portion 2a to the handle shaft 30.

As shown in FIG. 2, an oblong hole 2c is formed in the arm portion 2a where it is mounted onto the handle shaft 30. The arm portion 2a is engaged non-rotatively with the handle shaft 30 by engaging the beveled portions 30b into this oblong hole 2c. A substantially teardrop accommodating recess 2d, configured as an envelope curve linking both a large-diameter section and a small-diameter section that is at a remove from the large-diameter section, is formed surrounding the oblong hole 2c.

The nut 28 is kept from rotating with a retainer 29, which is fitted into the accommodating recess 2d of the arm portion 2a. The nut 28 is a hexagonal cap nut having a hexagonally formed nut portion 28a of predetermined length and a frustum-shaped cap portion 28b whose diameter is smaller than that of the nut portion 28a and tapers gradually. The axial length of the nut portion 28a (predetermined length) is 0.8 to 1.3 times the thickness of the retainer 29.

By setting the axial length of the nut portion 28 in this range, the nut portion 28a hardly protrudes from the outer surface of the retainer 29, and the likelihood of the nut portion being felt by the hands or otherwise coming in to contact with fishing line is reduced. The configuration of the cap portion 28 rounds the end smooth, making it unlikely to get caught on fishing line.

The retainer 29 is an approximately teardrop, plate-shaped member made of metal, such as a piece of stainless steel, whose outer form follows the rim of the accommodating recess 2d that is configured as the envelope curve linking both the large-diameter section and the small-diameter section at a remove from the large-diameter section. The thickness of the retainer 29 is substantially equal to the depth of the accommodating recess 2d. As a result, the retainer 29 is substantially coplanar with the outside surface of the arm portion 2a. A star-shaped engagement hole 29a with twelve corners is formed in the portion of the retainer 29 that corresponds to the large-diameter section and interlocks with the outer corners of the nut portion 28a. A small screw 29b having a threaded portion and a head for preventing it from falling off and for limiting its rotation is mounted in the portion that corresponds to the small-diameter section. With this small screw 29, the retainer 29 is fastened to the arm portion 2a. In the portion of the retainer 29 where the small screw is mounted, a circular mounting recess 29c is formed, so that the head of the small screw 29b does not protrude from the outer surface of the arm portion 2a. Thus, the fishing line is unlikely to get caught on or be cut into by the retainer 29 and the small screw 29b, because they do not protrude from the arm portion 2a.

Configuration of the Reel Unit

The reel body 1 is made of metal, such as an aluminum alloy or a magnesium alloy for example, and includes a frame 5, and a first side-cover 6 and a second side-cover 7 attached to the two sides of the frame 5. A spool 12 for winding fishing line is detachably fitted within the reel body 1, wherein it is allowed to rotate on a spool shaft 20 (see FIG. 3). When seen from the outside in the spool shaft direction, the first side-cover 6 is circular, and the second side-cover 7 is configured as staggered disks, with their two outer circumferences intersecting one another.

As shown in FIG. 3, the spool 12, a clutch lever 17 and a level wind mechanism 18 are disposed inside the frame 5. The clutch lever 17 functions as a thumb rest when pitching. The level wind mechanism 18 is for uniformly winding fishing line around the spool 12. A gear mechanism 19, a clutch mechanism 21, a clutch control mechanism 22, a drag mechanism 23, and a casting control mechanism 24 are disposed in the space between the frame 5 and the second side-cover 7. The gear mechanism 19 transmits rotational force from the handle 2 to the spool 12 and the level wind mechanism 18. The clutch control mechanism 22 controls the clutch mechanism 21 in response to the operation of the clutch lever 17. The drag mechanism 23 dampens the spool 12. The casting control mechanism 24 adjusts the resistance that develops when the spool 12 rotates. Also, a centrifugal braking mechanism 25 for preventing backlash when casting the fishing line is disposed between the frame and the first side-cover 6.

Configuration of the Frame

As shown in FIGS. 3 to 6, the frame 5 includes a pair of side-plates 8 and 9 disposed in opposition to each other at a predetermined spacing, and upper and lower connecting portions 10a and 10b connecting the side-plates 8 and 9 into one unit. Of the pair of side-plates 8 and 9, the side-plate 9 is on the side where the handle 2 is attached, that is, on the right side. in FIG. 3. Together with the second side-cover 7, it forms part of a first cylindrical portion 11a and a second cylindrical portion 11b that has substantially the same diameter as the first cylindrical portion 11a. Inside the first cylindrical portion 11a, there is a columnar first space, and inside the second cylindrical portion 11b, there is a second space that communicates interiorly with the first space. The outer circumference of the second cylindrical portion 11b, which protrudes in the spool shaft direction from the first cylindrical portion 11a, is disposed staggered downward towards the front, so that it intersects with the outer circumference of the first cylindrical portion 11a. Furthermore, the outer peripheral surfaces of the first cylindrical portion 11a and the second cylindrical portion 11b partially overlap in the spool shaft direction.

The side-plate 8, which is disposed on the side opposite to where the handle is attached, that is, on the left side in FIG. 3, is a flat and cylindrical element with a base, having a space inside that is circular when seen in spool shaft direction. A circular opening 8a for attaching and detaching the spool 12 is formed slightly above the center of the side-plate 8. An internally threaded portion 8b is formed on the inner peripheral surface of the opening 8a. A spool support portion 13, which supports the left end of the spool shaft 20 serving as the rotation shaft for the spool 12, is provided detachably at the internally threaded portion 8b.

Figure 6:
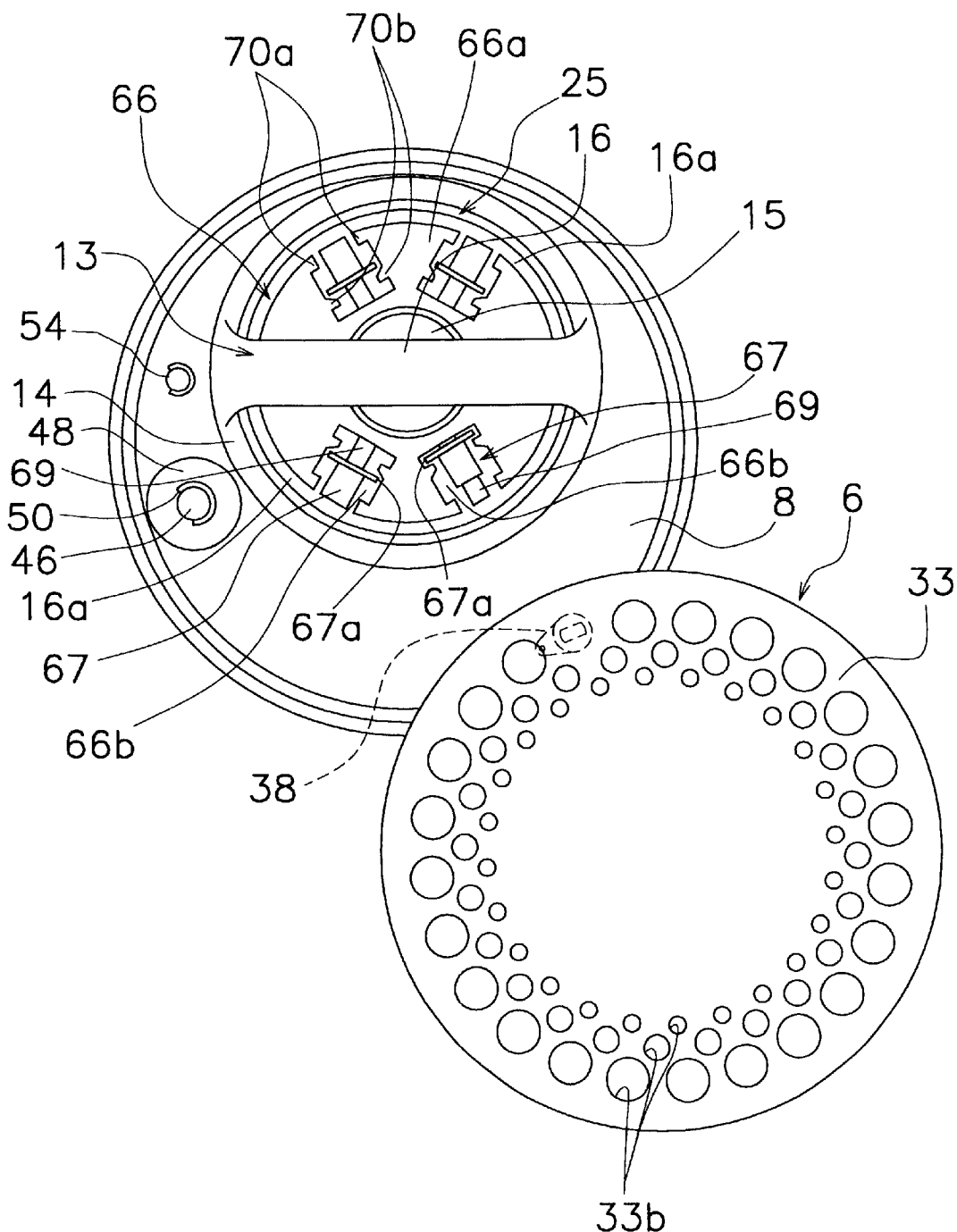
FIG. 6 is a lateral view, seen from the right as the first side-cover is open.

As shown in FIGS. 1, 3 and 6, the spool support portion 13 includes a ring portion 14, a cylindrical bearing portion 15 having a base, and a convex handle portion 16. The ring portion 14 is installed detachably in the opening 8a. The bearing portion 15 is arranged concentrically to the ring portion 14 to the inner side of the ring portion 14. The convex handle portion 16 connects the ring portion 14 with the bearing portion 15 and is for turning the spool support portion 13. These portions are formed in one piece of plastic or metal.

On the outer peripheral surface of the ring portion 14, an externally threaded portion 14a is formed, which can be screwed into the internally threaded portion 8b formed in the opening 8a. A brake liner 68 of a centrifugal braking mechanism 25 is fastened to the inner peripheral surface of the ring portion 14.

A bearing 26b for rotatively supporting one end of the spool shaft 20 is provided at the inner peripheral surface of the bearing portion 15. A friction plate 51 of the casting control mechanism 24 is mounted on its bottom.

Curved convexly outward in axial direction, the convex handle portion 16 connects the ring portion 14 with the bearing portion 15 and is disposed along a diameter direction of these. As a result, openings 16a are formed on both sides of the convex handle portion 16. It is possible to see the side of the spool 12 and to introduce one's fingertips through these openings 16a.

Figure 5:
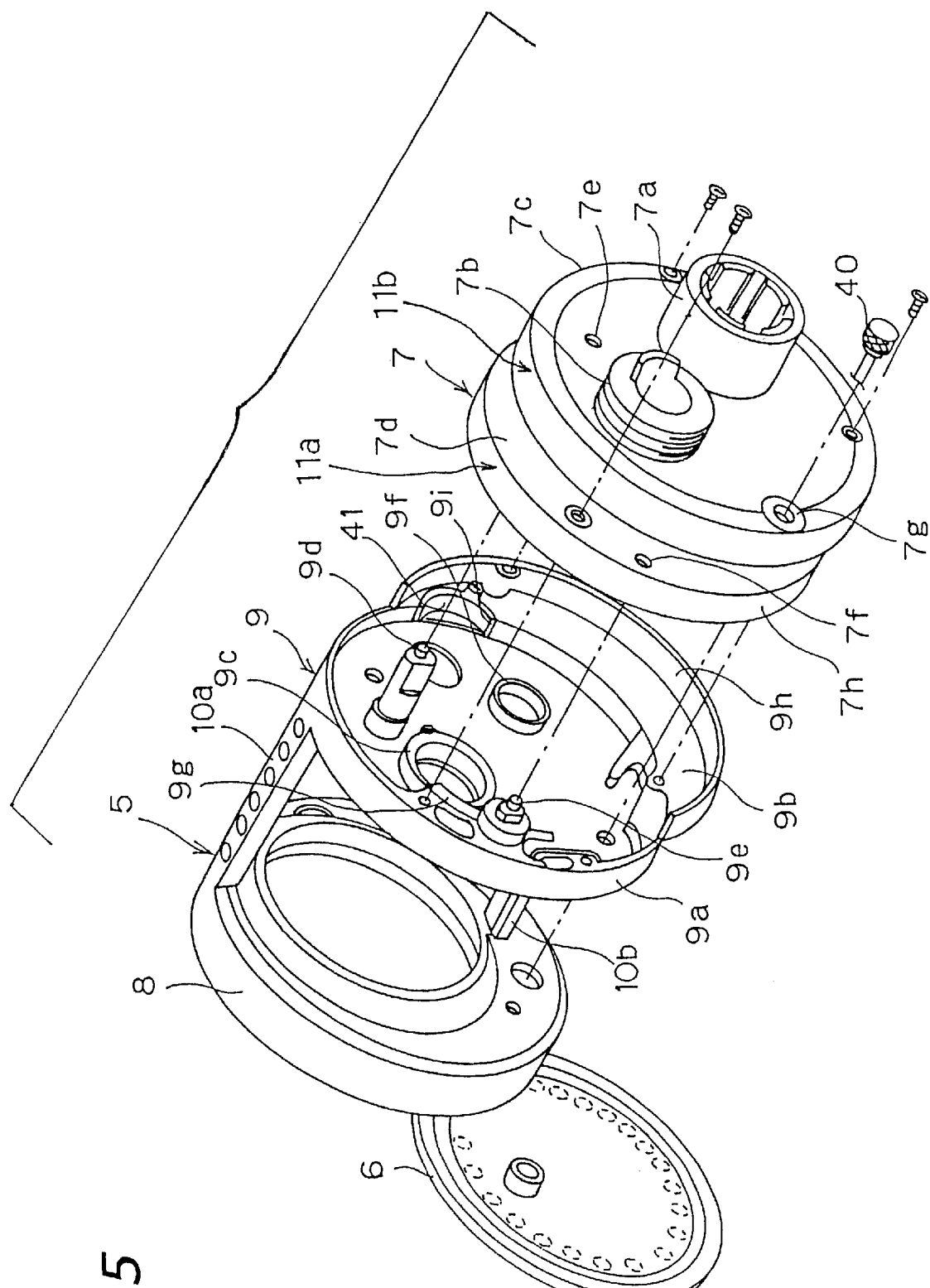
FIG. 5 is an oblique view of the reel body, with its left (second) side-cover shown exploded, and its right (first) side-cover pivoted down, from the reel body.

As shown in FIG. 5, the right side-plate 9 includes a flat cylindrical mounting section 9a having a base and a protruding section 9b. The mounting section 9a has the same diameter as the side-plate 8. The protruding section 9b is formed on the edge of the mounting section 9a staggered diagonally downward to the front, such that its outer circumference intersects with the outer circumference of the mounting section 9a. The protruding section 9b is formed as a crescent-shaped circular arc. A boss 9c supporting a pinion gear 32, described below, is formed in the base of the mounting section 9a. Two upright positioning pins 9d and 9e for positioning the second side-cover 7 are provided on both sides of the boss 9c. On the tips of the positioning pins 9d and 9e, small-diameter nibs with are formed, and the side-plate 9 is positioned with respect the second side-cover 7 by inserting the nibs into locating holes 7e and 7f formed in the second cover 7.

Furthermore, diagonally below of the boss 9c, a boss 9f supporting the base end of the handle shaft 30 is formed. The boss 9f is formed in the section in which the outer circumference of the mounting section 9a is coincident with the outer circumference of the protruding section 9b. Moreover, a slightly indented, fan-shaped guide portion 9g for guiding the clutch plate 55 of the clutch control mechanism is formed between the boss 9c and the positioning pin 9e. An inner/outer circumferentially penetrating cut-out 9i for locating a gear member 63 (see FIG. 11) of the level wind mechanism 25 is formed extending from the rim on the front side of the mounting section 9a to the base of the protruding section 9b. A cover member 41 that is curved in a circular arc to follow the outer edge of the gear member 63a is detachably fitted on to shut this cut-out portion 9i. On the protruding section 9b, a rim 9h is formed that is curved in a circular arc to follow the outer edge of the section crescent-shaped from the portion that slants diagonally downward towards the front. The rim 9h is formed in the protruding section 9b up to the positions where the two outer circumferences intersect.

Figure 4:
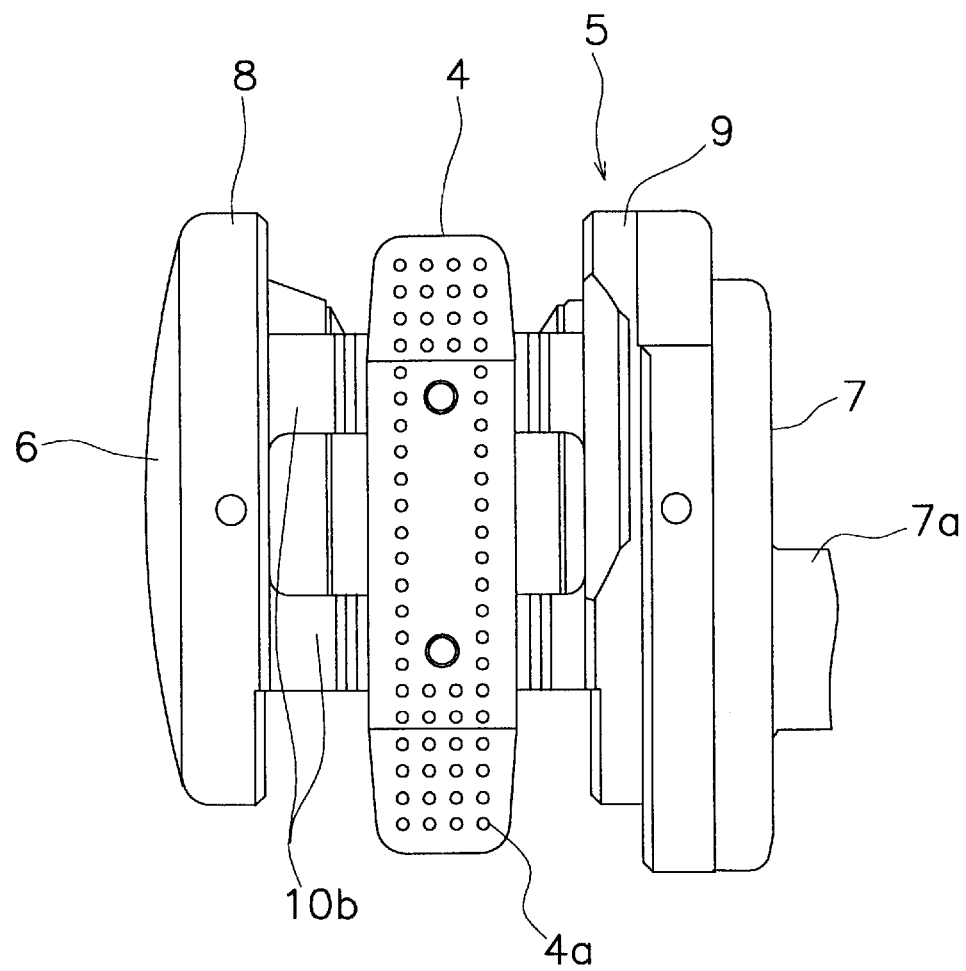
FIG. 4 is a bottom view of the dual-bearing reel in FIG. 1.
Figure 7:
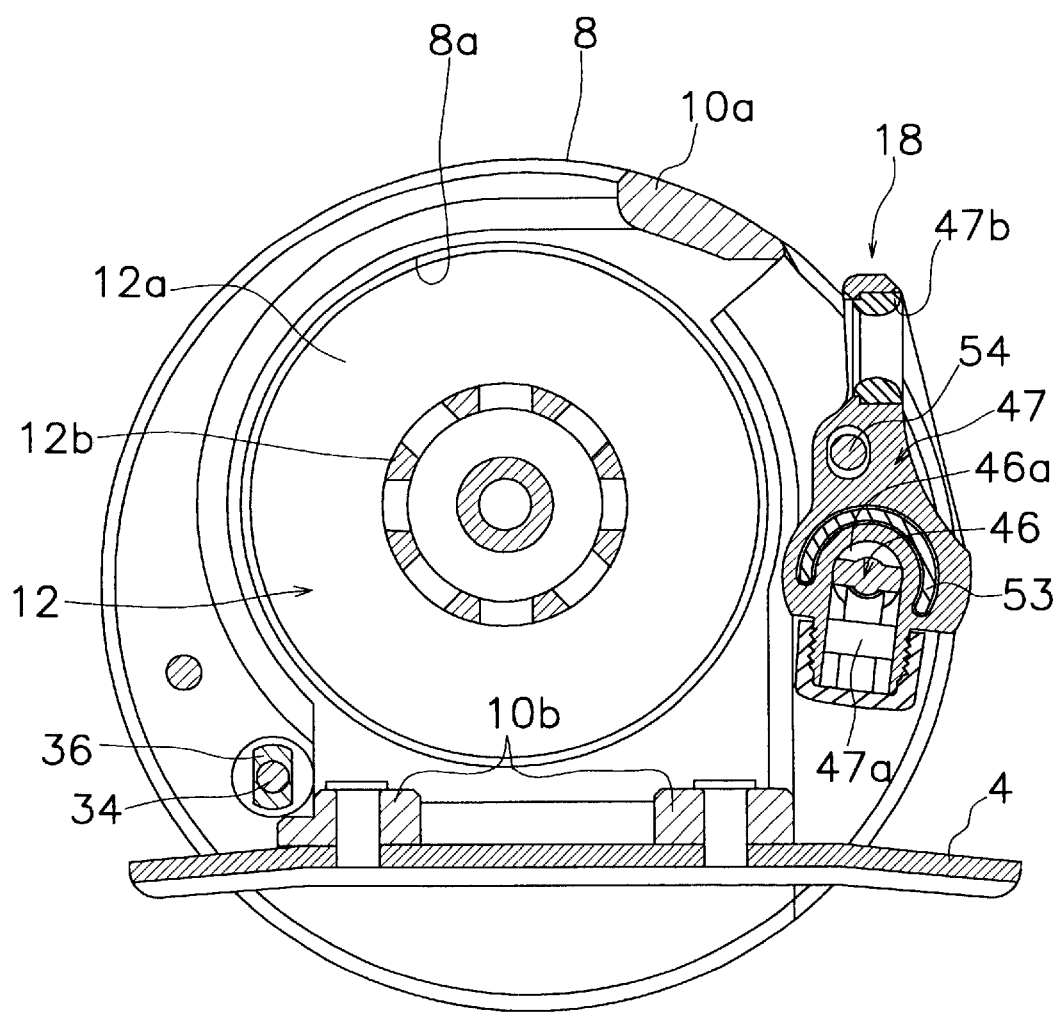
FIG. 7 is a transverse sectional view of the dual-bearing reel.

The upper connecting portion is arranged in the same plane as the perimeter of the side-plates 8 and 9, whereas a pair of front and rear connecting portions 10b are formed inwardly from the perimeter. As shown in FIGS. 4 and 7, extending front to rear, an oblong rod-mounting leg 4 made of metal, such as an aluminum alloy for example, is mounting the reel to a fishing-rod is riveted to the lower connecting portions 10b. On the rear surface of the rod-mounting leg 4, multiple anti-slipping portions 4a made of circular concavities are formed, especially at both ends. These anti-slipping portions 4a are made by press-forming, and are also provided to enhance the flexural rigidity of the rod-mounting leg 4 due to the work-hardening effect.

Configuration of the First Side-cover

Figure 8:
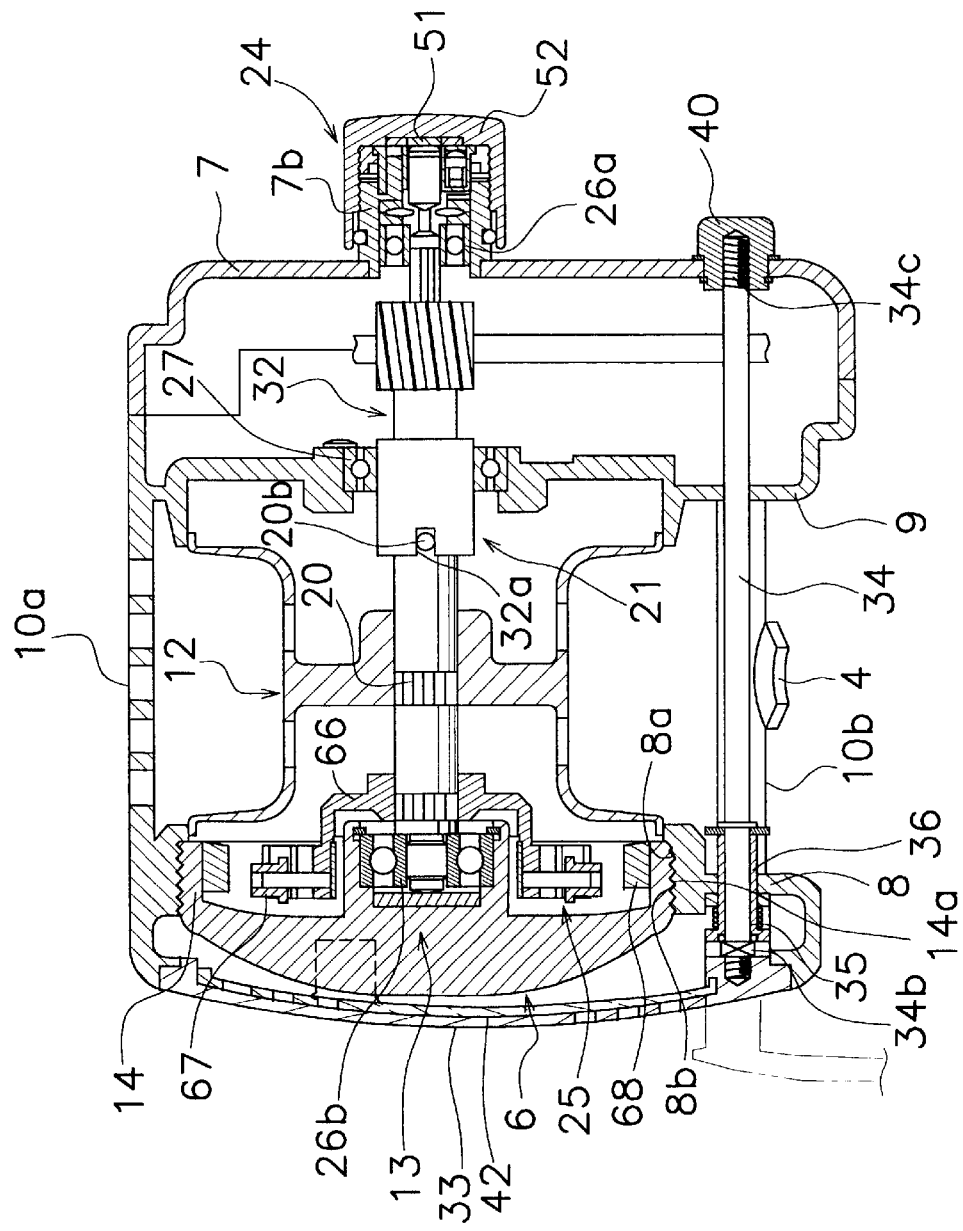
FIG. 8 is a vertical sectional view of the dual-bearing reel.
Figure 9:
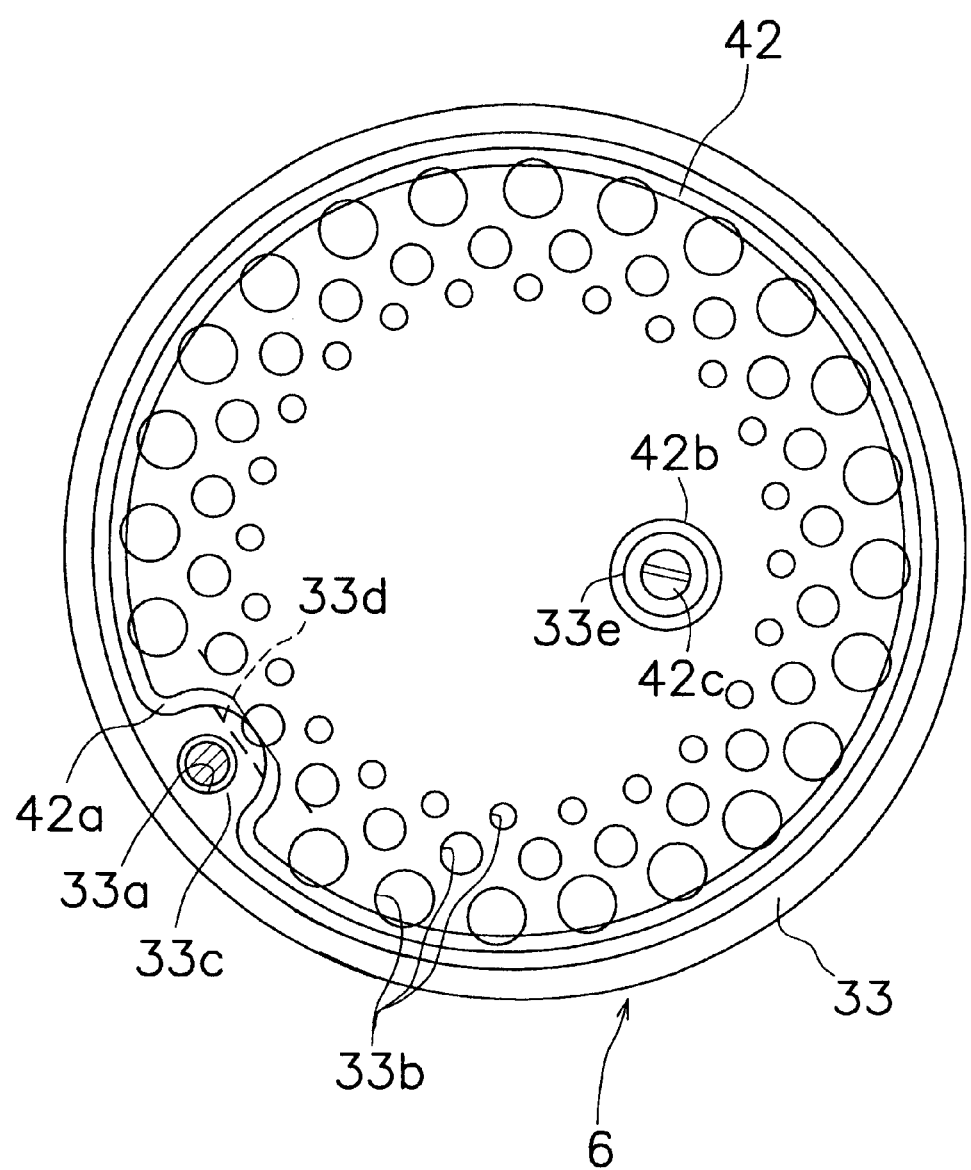
FIG. 9 is a front elevational view of the inside surface of the first side-cover.

As shown in FIGS. 6, 8 and 9, the first side-cover 6 can be opened or closed on the frame 5, and is mounted pivotally to the side-plate 8 to make it possible to attach and detach the spool 12. The first side-cover 6 can be pivoted from the closed position shown in FIGS. 3 and 4 to the open position shown in FIGS. 1 and 6. The first side-cover 6 includes a disk-shaped cover 33 covering the outer side of the side-plate 8, a pivot shaft 34 for pivotally supporting the cover 33, and a coil spring 35 urging the cover 33 away from the side-plate 8.

The cover 33 is made of a piece of metal that is slightly curved convexly outward so as to cover the side-plate 8. In order to enhance its appearance and to make it lighter, its peripheral portion is provided with multiple round holes 33b of varying diameter, spaced apart in the circumferential direction and the radial direction. On the inner surface near the periphery of the cover 33, a threaded hole 33a for attaching the pivot shaft 34 is formed. Around the threaded hole 33a, a boss 33c is formed protruding from the outer edge of the threaded hole 33a toward the center. At the boundary with the bottom of the boss 33c, an engagement portion 33d is cut out linearly and substantially along the circumferential direction. Moreover, an inwardly protruding attaching portion 33e (see FIG. 3) is formed on the inner surface of the cover 33, slightly deviating from its center. When the cover 33 is fitted to the side-plate 8, the attaching portion 33e is located at a position near the convex handle portion 16 of the spool support portion 13 where it can abut against the spool support portion 13, so that the spool support portion 13 is not loosened by rotation in a loosening direction.

A sealing member 42 for preventing the intrusion of debris or liquids through the round holes 33b is attached to the inner surface of the cover 33. The sealing member 42 is made of a synthetic resin, such as ABS (acrylonitrile butadiene styrene) resin, and is translucent so that its inside can be seen. As shown in FIG. 9, the sealing member 42 is curved convexly outward in adaptation to the curving of the cover 33, and its outer diameter follows the inner edge of the cover 33. At the portion of the sealing member 42 that runs along the boss 33c, a recess 42a is formed, which interlocks with the engagement portion 33d. Also, a cylindrical portion 42b covering the attaching portion 33e is provided on the inner surface of the sealing member 42. Penetrating this cylindrical portion 42b, a screw 42c is screwed into the attaching portion 33e, and the sealing member 42 is fastened to the rear surface of the first side-cover 6 with the recess 42a and the cylindrical portion 42b. That is to say, to attach the sealing member 42 to the first side-cover 6, the cylindrical portion 42b is slipped onto the attaching portion 33e, after fitting the recess 42a against the engagement portion 33d. Then, the screw 42c is screwed into the attaching portion 33e to fasten the sealing member 42 to the inner surface of the first side-cover 6.

Figure 10:
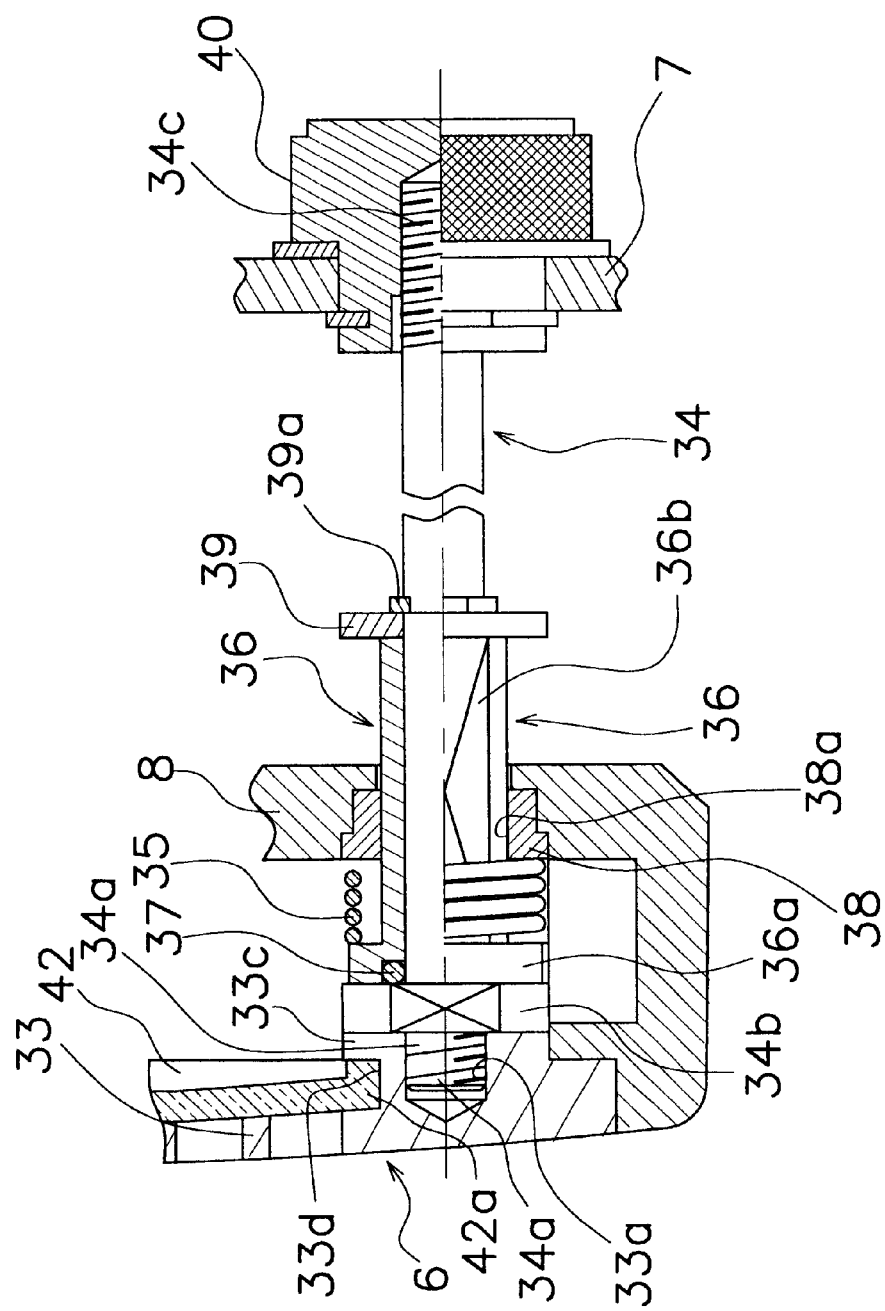
FIG. 10 is a fragmentary sectional view corresponding to and enlarged from FIG. 3.

As shown in FIG. 10, a threaded portion 34a that is screwed into the threaded hole 33a is formed on the tip of the pivot shaft 34. A tool engagement portion 34b with a larger diameter is formed adjacent to the threaded portion 34a. The threaded portion 34a is screwed into the cover 33, thereby fastening the pivot shaft 34 to the cover 33.

A pipe member 36 penetrating the side-plate 8 is arranged concentrically around the pivot shaft 34. The tip of the pivot shaft 34 is supported rotatively by the pipe member 36. The base end of the pivot shaft 34 is supported rotatively by the side-plate 9, and protrudes outward beyond the second cover 7. The pipe member 36 supports the pivot shaft 34 not only rotatively, but also such that the pivot shaft 34 cannot shift axially. A large-diameter section 36a is formed on the tip of the pipe member 36, and an O-ring 37 for restricting the pivoting speed is mounted inside this large diameter potion 36a.

Between the large-diameter section 36a and the side-plate 8, a compressed coil spring 35 is mounted around the pivot shaft 34. Parallel cut-away portions 36b are formed in the outer peripheral surface of the pipe member 36, except for the portion of the large diameter potion 36a. A support member 38 having an oval hole 38a for supporting the cut-away portions 36b non-rotatively but movably in the axial direction is screwed to the side-plate 8. A check disk 39 for checking the axial shifting of the pivot shaft 34 is fastened with a snap ring 39a to the base end of the pipe member 36. By retaining the pipe member 36 between this check disk 39 and the tool engagement portion 34b, the pivot shaft 34 cannot be shifted axially with respect to the pipe member 36. Also, when the first side-cover 6 is opened, the check disk 39 abuts against the side-plate 8, thus determining its axial position. Thus, the first side-cover 6 is mounted, pivotally and movably in the axial direction over a certain distance, to the side-plate 8, and can be opened and closed without falling off the side-plate 8.

A threaded portion 34c is formed on the base end of the pivot shaft 34. The threaded portion 34c is screwed into an attach/detach nut 40, which is an operating element for opening and closing the first side-cover 6. The attach/detach nut 40 is mounted to the second side-cover 7 rotatively but immovably with respect to the axial direction. When the threaded portion 34c is released from the attach/detach nut 40 by turning the attach/detach nut 40 counterclockwise, the pivot shaft 34 is urged by the coil spring 35 to the left in FIG. 4. Thereby, the cover 33, too, shifts to the left and the first side-cover 6 opens. As the first side-cover 6 opens, it pivots due to its own weight. The pivoting speed is adjusted to an appropriate speed with the O-ring 37.

Configuration of the Second Side-cover

As shown in FIG. 2 to 5, the second side-cover 7 has a lateral surface shaped like two staggered, intersecting circles that are identical with those of the side-plate 9. The second side-cover 7 is fasted to the side-plate 9 with, for example, three screws. The second side-cover 7 includes a mounting portion 7c and a protruding portion 7d. Following the protruding section 9b of the side-plate 9, the shape of the mounting portion 7c is that of a flat cylinder with a base, and the mounting portion 7c has the same diameter as the protruding section 9b. The crescent-shaped protruding portion 7d forms an arc that is disposed staggered diagonally to the rear above the edge of the mounting portion 7c opposing the mounting section 9a of the side-plate 9. A cylindrical boss 7a for supporting the handle shaft 30 and a cylindrical boss 7b for supporting the spool shaft 20 are attached to the base portion of the mounting portion 7c, spaced apart and protruding outward. The boss 7a is disposed coaxially with the boss 9f formed on the side-plate 9, and the boss 7b is disposed coaxially with the boss 9c. A locating hole 7e for positioning the second side-cover 7 is formed to the front of the boss 7b. Furthermore, a knob hole 7g, which rotatively supports the attach/detach nut 40 for opening and closing the first side-cover 6, is formed behind the boss 7a.

On the protruding member 7d, a rim 7h is formed that is curved in a circular arc following the outer edge of the section crescent-shaped from the portion that slants diagonally upward towards the rear. The rim 7h is disposed concentrically with the mounting section 9a of the side-plate 9, and is joined to the rim 9h of the protruding section 9b in the involute form. The configuration thus realizes a construction in which the outer peripheral surfaces (rims 9h and 7h) of the two cylindrical portions 11a and 11b overlap in the spool axial direction. The rims 9h and 7h are configured respectively as circular arcs, and are therefore readily machined.

A locating hole 7f is formed in a position on the protruding portion 7d astride the boss 7b opposite the locating hole 7e. As mentioned above, the positioning plate 9 is positioned with respect to the second side-cover 7 by inserting the nibs of the upright positioning pins 9d and 9b provided on the side-plate 9 into the locating holes 7e and 7f, and the bosses 9c, and 9f are centered and disposed coaxially with the bosses 7b and 7a.

Figure 12:
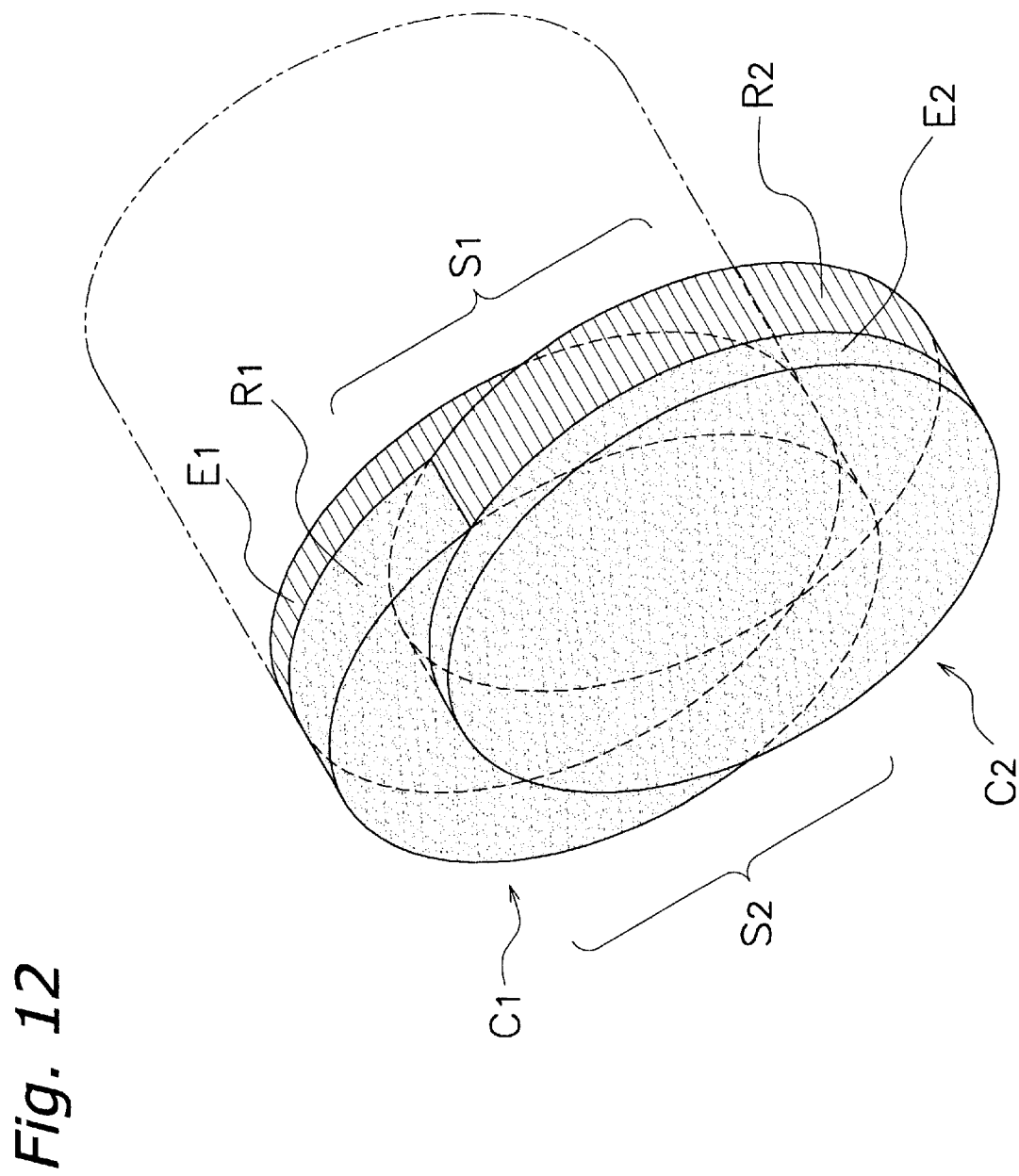
FIG. 12 is a conceptual diagram illustrating side-plate and side-cover configuration on the handle-mounting side of the dual-bearing reel.

In the thus configured reel body 1, the side-plate 9 with the second side-cover 7 forms two cylindrical portions 11a and 11b, interiorly having respective columnar spaces and staggered such that the outer circumferences of the two intersect. Put another way, the two cylindrical portions 11a and 11b are arranged spatially as though two perfectly coincident cylinders were pulled diametrically apart to stagger them by a certain extent, and at the same time pulled axially apart by a certain extent. This is illustrated conceptually by FIG. 12, in which cylinder $C_1$ corresponds to cylindrical portion 11a, cylinder $C_2$ to cylindrical portion 11b. The side-plate 9 and the second side-cover 7 may be thought of as complementary shells $S_1$ and $S_2$ formed as the remainder when the region of intersection of the two cylindrical portions 11a and 11b is removed. The cylinders $C_1$ and $C_2$ thus include cylindrically whole, opposite end sections $E_1$ and $E_2$ each contiguous with a crescent section $R_1$ and $R_2$. In the preferred embodiment, shell $S_1$, corresponding conceptually to the side-plate 9, is made up of cylindrically whole end section $E_1$ of cylinder $C_1$ and diametrically and axially staggered crescent section $R_2$. Shell $S_2$, corresponding conceptually to the second side-cover 7, is made up of cylindrically whole end section $E_2$ of cylinder $C_2$ and diametrically and axially staggered crescent section $R_1$. Accordingly, the side-plate 9 and the second side-cover 7 each includes a cylindrically whole end section of one of the two cylindrical portions 11a and 11b, and a crescent section from the other of the two, diametrically and axially staggered with respect to the end section.

Therefore, by configuring the second cylindrical portion 11b as a protruding portion therein that projects outward, the outer peripheral surfaces are readily machined, even wherein a protruding portion is furnished to enhance the rotational efficiency. That is, the cylindrical end section and the crescent section of the shells as described above may each be turned on a lathe. This serves to improve the style and decorativeness in the outward appearance of the reel body in the dual-bearing reel having a protruding portion.

Configuration of the Spool

As shown in FIG. 3, the spool 12 has saucer-shaped flange portions 12a on both ends and a cylindrical spool body 12b between the two flange portions 12a. The spool 12 also has a cylindrical boss 12c, formed in one piece with it at substantially the center with respect to the axial direction on the inner side of the spool body 12b. The spool 12 is fixed non-rotatively, for example by serration coupling, to the spool shaft 20 penetrating the boss 12c. The fixing is not limited to serration coupling, and other coupling methods such as key coupling or spline coupling can be employed as well.

The spool shaft 20 penetrates the side-plates 9 and extends beyond the second side-cover 7. This end of the spool shaft 20 is supported rotatively with a bearing 26a at the boss 7b, which is provided at the second side-cover 7. The other end of the spool shaft 20 is supported rotatively with the bearing 26b as described above.

The right end of the large-diameter section 20a of the spool shaft 20 is disposed at a portion where the side-plate 9 is pierced, and an engaging pin 20b, which is part of the clutch mechanism 21, is fixed in the spool shaft 20 at this place. The engaging pin 20b pierces the large-diameter section 20a through its diameter and protrudes from both sides in radial direction.

Configuration of Other Elements

As shown in FIG. 1, the clutch lever 17 is disposed at the rear end of the pair of side-plates 8 and 9 behind the spool 12. The clutch lever 17 slides vertically between the side-plates 8 and 9. On the side of the clutch lever 17 where the handle is mounted, an engagement shaft 17a, which is formed in one piece with the clutch lever 7, pierces the side-plate 9. The engagement shaft 17a is engaged with the clutch control mechanism 22.

As shown in FIGS. 3 and 7, the level wind mechanism 18 is disposed between the two side-plates 8 and 9 in front of the spool 12. The level wind mechanism 18 includes a threaded shaft 46 on whose outer peripheral surface intersecting helical grooves 46 are formed, and a fishing line guide portion 47, which can be shifted back and forth on the threaded shaft 46 in the spool shaft direction. The two ends of the threaded shaft 46 are supported rotatively by shaft support portions 48 and 49 provided at the side-plates 8 and 9. In FIG. 3, the left end of the threaded shaft 46 is held by an E-shaped retaining ring 50. The gear member 63a is attached to the right side of the threaded shaft 46 in FIG. 3. The gear member 63a meshes with a gear member 63b that is attached non-rotatively to the handle shaft 30. With this configuration, the threaded shaft 46 is linked to and rotated by a rotation of the handle shaft 30 in the direction taking up the line.

As shown in FIG. 7, the fishing line guide portion 47 is disposed around the threaded shaft 46 and is guided in the direction of the spool shaft 20 by a pipe member 53 and a guide shaft 54. A portion of the pipe member 53 is cut away over its entire axial length. The guide shaft 54 is disposed above the threaded shaft 46. An engagement member 47a, which engages with the helical grooves 46a, is mounted rotatively on the fishing line guide portion 47 and is moved back and forth in the spool shaft direction by the rotation of the spool shaft 46. An oval guide ring 47b, through which the fishing line is passed, is provided on the upper end of the fishing line guide portion 47. The guide ring 47b can be made of a hard ceramic material such as SiC.

Figure 11:
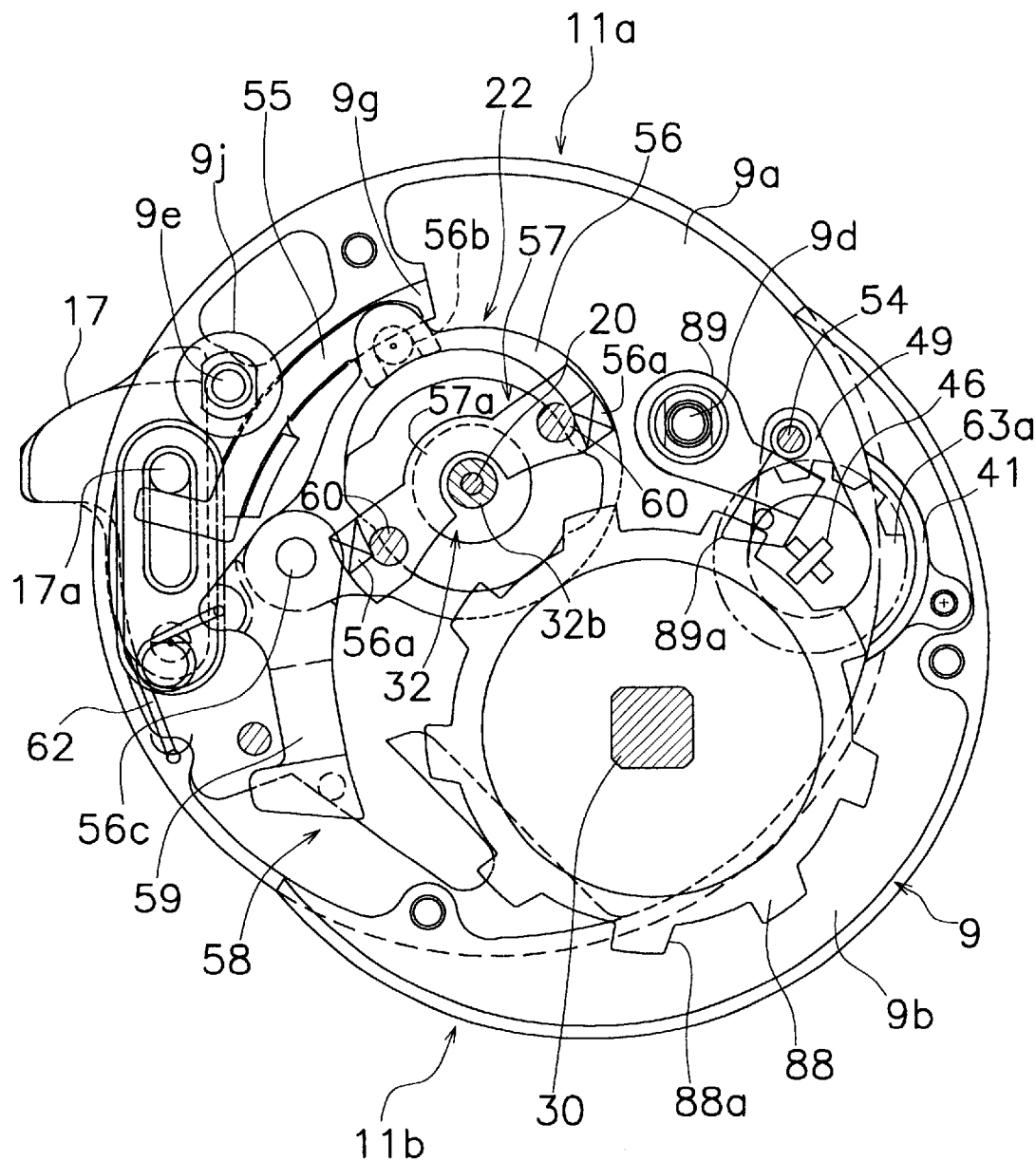
FIG. 11 is a lateral section view, shown when the second side-cover is open.

The pipe member 53 interlocks with the shaft support portions 48 and 49. The guide shaft 54 is fixed to the side-plates 8 and 9 and the end of the guide shaft 54 at the side-plate 9 protrudes further toward the side-cover 7. As shown in FIG. 11, the shaft support portion 49 is substantially tear-shaped. It supports the threaded shaft 46 rotatively at a portion where its diameter is large, and is pierced by the guide shaft 54 at a portion where its diameter is small, keeping the shaft support portion 49 from rotating.

As shown in FIG. 3, the gear mechanism 19 includes a handle shaft 30, a main gear 31 fixed to the handle shaft 30, and a cylindrical pinion gear 32 meshing with the main gear 31. The handle shaft 30 is supported rotatively by the boss 9f and the boss 7a, and a roller type one-way clutch 86 and a pawl type one-way clutch 87 prevent the handle shaft 30 from rotating in the direction unwinding the line (reverse rotation).

The one-way clutch 87 is provided between the boss 7a and the handle shaft 30. As shown in FIG. 11, the one-way clutch 87 includes a ratchet gear 88 and a ratchet pawl 89. The ratchet gear 88 is mounted non-rotatively to the handle shaft 30 between the main gear 31 and the gear member 63b. The ratchet pawl 89 can pivot around the positioning pin 9d. Substantially parallelogram-shaped ratchet teeth 88a protrude at certain intervals in the circumferential direction on the periphery of the ratchet gear 88. The ratchet pawl 89 keeps the handle shaft 30 from rotating in a direction unwinding the line by engaging with the ratchet teeth 88a. The tip of the ratchet pawl 89 is provided with control pieces 89a flanking the ratchet gear 88 on both sides. The control pieces 89a keep the ratchet pawl 89 close to the ratchet gear 88 during a rotation in the direction that winds up the line and separate the ratchet pawl 89 from the ratchet gear 88 during a rotation in the direction that unwinds the line. When the ratchet pawl 89 separates from the ratchet gear 88, the ratchet pawl 89 abuts the guide shaft 54 to prevent the ratchet pawl 89 from separating too much.

The main gear 31 is mounted rotatively on the handle shaft 30, and is coupled to the handle shaft 30 via the drag mechanism 23.

As shown in FIG. 3, the pinion gear 32 extends from outside of the side-plate 9 to the inside thereof. The pinion gear 32 is cylindrical and is pierced by the spool shaft 20, on which it is mounted movably in the axial direction. A bearing 27 in the side-plate 9 supports the left side of the pinion gear 32 in FIG. 3 rotatively and movably in the axial direction. A meshing groove 32a meshing with the engagement pin 20b is formed at the left end of the pinion gear 32 in FIG. 3. The meshing groove 32a and the engagement pin 20b form the clutch mechanism 21. A center portion of the pinion gear 32 is provided with a constricted portion 32b, and the right end of the pinion gear 32 is provided with a gear portion 32c meshing with the main gear 31.

As shown in FIG. 11, the clutch control mechanism 22 includes a clutch plate 55, a clutch cam 56, and a clutch yoke 57. The clutch plate 55 is engaged with the engagement shaft 17a. The clutch cam 56 is engaged with the clutch plate 55 and rotates around the spool shaft 20. The clutch cam 56 moves the clutch yoke 57 in the direction of the spool shaft 20. The clutch control mechanism 22 also includes a clutch return mechanism 58, which clutches the clutch mechanism 21 on when the spool 12 rotates in the direction winding up the line.

The clutch plate 55 is an arcuate plate-shaped member and is guided in the rotation direction by the guiding portion 9g formed in the side-plate 9. A collar 9j on the positioning pin 9e forms a gap together with the guide portion 9g and prevents the clutch plate 55 from drifting off. One end of the clutch plate 55 extends to a position where it contacts the lower end of the engagement shaft 17a of the clutch lever 17, so that the clutch plate 55 moves counterclockwise in FIG. 11 when the clutch lever 17 is moved downward. The other end of the clutch plate 55 interlocks with the clutch cam 56, and the clutch plate 55 and the clutch cam 56 turn in cooperation around the spool shaft 20.

The clutch cam 56 is a substantially ring-shaped plate, provided rotatively around the spool shaft 20 in the boss 9c. A pair of oblique cam protrusions 56a are formed in opposition to one another at positions on the outer lateral surface of the clutch cam 56, flanking the spool shaft 20. An engaging pin 56b that is engaged with the clutch plate 55 is formed on the outer peripheral portion of the clutch cam 56. Furthermore, a coupling portion 56c for coupling with a return pawl 59 that is part of the clutch return mechanism 58 is also formed on the outer peripheral portion of the clutch cam 56.

The clutch yoke 57 is disposed in axial opposition to the clutch cam 56. The clutch yoke 57 is movable in the direction of the spool shaft 20, guided by two upright guide shafts 60, which are provided between the side-plate 9 and the second side-cover 7, flanking the spool shaft 20. The clutch yoke 57 is urged inward in the axial direction by compressed coil springs 61 (see FIG. 3) that are provided around the guide shafts 60 between the second side-cover 7 and the clutch yoke 57. The clutch yoke 57 is provided with a semi-circularly arced engaging portion 57a that is engaged with the constricted portion 32b of the pinion gear 32. On a side surface opposing the clutch cam 56, the clutch yoke 57 is provided with inclined faces (not shown in the drawings) resting on the cam protrusions 56a. When the clutch cam 56 is turned counterclockwise in FIG. 11, the protrusions 56a lift the inclined faces and the clutch yoke 57 is moved to a clutch-off position on the right in FIG. 3. When the inclined faces are lowered from the protrusions 56a, the clutch yoke 57 is urged back into the clutch-on position by the coil spring 61. Shifting the clutch yoke 57 moves the pinion gear 32 in the spool shaft direction, so that the clutch mechanism 21 can be switched to a clutch-off state or to clutch-on state.

The clutch return mechanism 58 includes a return pawl 59 and a toggle spring 62. The return pawl is coupled rotatively to the coupling portion 56c of the clutch cam 56, and the toggle spring 62 biases the return pawl 59. Turning the clutch cam 57 shifts the return pawl 59, which is guided by the side-plate 9, between a position where it contacts the ratchet teeth 88a of the ratchet gear 88 and a position where it is separated from the ratchet teeth 88a. The toggle spring 62 holds the return pawl 59 in these two positions.

With this clutch return mechanism 58, the return pawl 59 is guided by the side-plate 9 and proceeds to a position where it is in contact with the ratchet teeth 88a when pushing the ratchet lever 17 down puts the clutch mechanism 21 into the clutch-off state. If, in this situation, turning the handle 2 rotates the handle shaft 30 in the direction winding up the line, then the return pawl 59 is pushed by the ratchet teeth 88a and shifts to the position away from the ratchet teeth 88a, the ratchet cam 56 turns clockwise in FIG. 11, and the clutch mechanism 21 returns to the clutch-on state.

The casting control mechanism 24 includes a plurality of friction plates 51 and a braking cap 52. The friction plates 51 are disposed on both ends of the spool shaft 20. The braking cap 52 is for adjusting the force with which the friction plates 51 are pressed against the spool shaft 20. The left friction plate 51 is provided inside the spool support portion 13.

As shown in FIGS. 3 and 6, the centrifugal braking mechanism 25 includes a rotor 66, cylindrical sliders 67, and a brake liner 68. The rotor 66 is fixed to the spool shaft 20 so that it rotates together with the spool 12. The sliders 67 are attached to the rotor 66 at certain intervals in the circumferential direction and are movable in the radial direction. The brake liner 68 is fixed to the inner peripheral surface of the ring portion 14 and can be brought into contact with the sliders 67. The rotor 66 includes a circular plate 66a provided around the bearing portion 15. For example six recesses 66b are formed in the circular plate 66a, spaced apart at intervals in the circumferential direction. In these recesses 66b, two pairs of opposing engagement projections 70a and 70b are formed at a certain distance in the radial direction. The engagement projections 70a are formed projecting towards one another at an outer periphery of the circular plate 66a and prevent the sliders 67 from falling off. The engagement projections 70b formed more to the inside than the engagement projections 70a and prevent the sliders 67 from contacting the brake liner 68. Furthermore, guide shafts 69 are provided at the bottom surface of the recesses 66b, fanning out in the radial direction. Guided by the guide shafts 69, the sliders 67 can shift back and forth thereon.

The sliders 67 are cylindrical and are provided at their inward edge portions with collars 67a engagement with the engagement portions 70a and 70b. The diameter of those collars 67a is larger than that of the other portions. When the spool 12 rotates, centrifugal forces act on the sliders 67 and bring the sliders 67 into contact with the brake liner 68, thereby braking the spool 12. If the collars 67a are located inwardly beyond the engagement projections 70b, then the collars 67a abut the engagement projections 70b when centrifugal forces are at work, so that the sliders 67 cannot be brought into contact with the brake liner 68. The braking force of the centrifugal braking mechanism 25 can then be adjusted by switching the radial positions of the sliders 67.

Attaching and Detaching the Spool

To remove the spool 12 from the reel body 1, for example when backlash has caused the fishing line to become entangled with the spool 12, the first cover 6 is opened, revealing the opening 8a in the side-plate 8.

To open the first side-cover 6, first, the attach/detach nut 40 is turned counterclockwise, and the pivot shaft 34 is detached from the attach/detach nut 40. When the pivot shaft 34 has been detached from the attach/detach nut 40, the spring force of the coil spring 35 urges the pivot shaft 34 to the left in FIG. 4, together with the first side-cover 6. Then, the first side-cover 6 pivots around the pivot shaft 34 by its own weight, and the first side-cover 6 opens. FIGS. 1 and 5 illustrate the situation when the first side-cover is open. Opening the first side-cover 6 reveals the spool support portion 13. In this situation, it is possible to insert one's fingers through the opening 16a and switch the position of the sliders 67 of the centrifugal braking mechanism 25 in the radial direction of the spool to adjust the braking force. That is to say, when the sliders 67 are located on the inside of the engagement projections 70b, they cannot be brought into contact with the brake liner 68, so that the braking force is weakened.

When the first side-cover 6 is open, it is possible to hold the convex handle portion 16 with thumb and index finger and turn the spool support portion 13 counterclockwise. This detaches the spool support portion 13 from the side-plate 8 and reveals the opening 8a. In this situation, it is possible to take the spool shaft 20 and pull it out to remove the spool 12.

To insert the spool 12, the spool support portion 13 is attached to the side-plate 8 and the first side-cover 6 is closed, after the spool 12 has been placed inside the reel body 1. To do so, the cover 33 is swung by hand into its closed orientation and then pressed toward the side-plate 8. In this situation the attach/detach nut 40 is turned clockwise and screwed onto the tip of the pivot shaft 34, thereby closing the first side-cover 6 on the side-plate 8.

Operation and Function of the Reel During Actual Fishing

When casting, the clutch lever 17 is pushed down. This moves the clutch plate 55 counterclockwise in FIG. 11. This moves the clutch plate 55 on the inside of the guide portion 9g while the positioning pin 9e prevents it from drifting off. Moving the clutch plate 55 turns the clutch cam 56 counterclockwise, which shifts the clutch yoke 57 outward in FIG. 3 to the clutch-off position. As a result, the pinion gear 32, which is part of the clutch mechanism 21, shifts outward in the axial direction to the clutch-off state. In this clutch-off state, the spool 12 can rotate freely, and the fishing line unwinds with full momentum due to the weight of the lure when casting.

When the lure has hit the water, the handle 2 is rotated in the direction taking up the line. This causes the ratchet gear 88 to rotate in the direction taking up the line (that is, clockwise in the drawings), and the ratchet tooth 89 pivots around the positioning pin 9 away from the ratchet gear 88 due to the function of the control pieces 89a and abuts the guide shaft 54. As a result, when taking up line, the ratchet pawl 89 does not contact the ratchet gear 88, and the clicking sound caused by the contact between the two when taking up line is averted. Also, when the ratchet gear 88 rotates in the direction for taking up line, the ratchet teeth 88a abut against the tip of the return pawl 59 and push the return pawl 59 back. The return pawl 59 retreats beyond the dead point of the toggle spring 62, and is urged by the toggle spring 62 into a separated position. This movement turns the clutch cam 56 clockwise in FIG. 11 and the spring force of the coil spring 61 urges the clutch yoke 57 into the clutch-on position, putting the clutch mechanism 21 into the clutch-on state. Thus, the rotation of the handle 2 is transmitted to the spool 12, and the spool 12 rotates in the direction taking up line.

When the handle shaft 30 rotates in the direction taking up line, this rotation is relayed by the gear members 63a and 63b to the threaded shaft 46. As the threaded shaft 46 rotates, the fishing line guide portion 47 moves back and forth in the spool shaft direction, so that the fishing line is taken up uniformly by the spool 12.

Other Embodiments a) To form the two cylindrical portions 11a and 11b having intersecting outer circumferences with the side-plate 9 and the second side-cover 7, in the preceding embodiment the two cylindrical portions 11a and 11b were provided with the same diameter, but it is also possible to provide the second cylindrical portion 11b on the side on which the handle shaft 30 is mounted with a different diameter than the first cylindrical portion 11a.

b) In the preceding embodiment, the protruding section 9b is formed staggered downward to the front with respect to the spool shaft 20, but as long as the stagger direction is toward the fishing rod, there is no limitation with regard to front or back.

c) In the preceding embodiment, the first cylindrical portion 11a and the second cylindrical portion 11b are covered with a single second side-cover 7, but it is also possible to provide separate second side-covers 7 to cover the cylindrical portions 11a and 11b.

d) In the preceding embodiment, the second side-cover 7 is formed in a cutting process so as to enhance its appearance, but is also possible to form the second side-cover 7, for example, in a pressing or a die casting process without cutting.

e) In the foregoing embodiment, the side-plate 9 and the second side-cover 7 are configured each to include a cylindrically whole end section of one of the two cylindrical portions 11a and 11b, and the diametrically and axially staggered crescent section from the other of the two. Alternatively, the complementary shells by which the side-plate 9 and the second side-cover 7 may be conceived could instead be configured each to include the cylindrically whole end section as well as the axially contiguous crescent section of the same one of the two cylindrical portions 11a and 11b.

In accordance with the present invention, the side-plate and the side-cover form two staggered cylindrical portions with intersecting outer circumferences. By configuring the protruding portion with the second cylindrical portion that therein projects outward, the outer peripheral surfaces are readily machined, even wherein a protruding portion is furnished to enhance the rotational efficiency. At the same time, the dual cylindrical configuration of the side plate and side cover does not impart the odd feel to the design arising in reels with the rectangular protrusion. This serves to improve the style and decorativeness in the outward appearance of the reel body in the dual-bearing reel having a protruding portion.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A fishing-rod attachable dual-bearing reel body on a lateral surface of which a handle is disposed and interiorly in which a spool is disposed on a shaft, the dual-bearing reel body comprising:

a frame having a pair of side-plates between which the spool is disposed and connecting members for connecting the side-plates;

a pair of side-covers exteriorly covering either side-plate, said handle being mounted on a proximal one of the pair of side-covers; and a fishing rod mount disposed between the pair of side-plates for attachment to a fishing rod; wherein on the side in which the handle is mounted, said proximal side-cover together with a proximal one of the side-plates constitute a first cylindrical portion interiorly having a columnar first space, and a second cylindrical portion staggered such that the outer circumference of the second cylindrical portion intersects the outer circumference of the first cylindrical portion, therein protruding outward in the spool shaft direction with respect to the first cylindrical portion and interiorly having a columnar second space communicating interiorly with the said first space.

2. A dual-bearing reel unit as set forth in claim 1, wherein the outer peripheral surfaces of the first cylindrical portion and the second cylindrical portion at least partially overlap in the spool shaft direction.

3. A dual-bearing reel unit as set forth in claim 1, wherein the two cylindrical portions have approximately the same diameter.

4. A dual-bearing reel unit as set forth in claim 1, wherein the proximal side-cover is positioned with respect to the proximal side-plate by a plurality of locating members.

5. A dual-bearing reel unit as set forth in claim 1, wherein outer peripheral surfaces of the frame and the side-covers are machined.

6. A dual-bearing reel unit as set forth in claim 1, wherein the distal side-cover can be opened and closed with respect to the distal side-plate.

7. A dual-bearing reel unit as set forth in claim 1, wherein a cut-out portion for mounting a gear member attached endwise to a threaded shaft of a level wind mechanism for rotating the threaded shaft to wind fishing line uniformly onto the spool, is formed on an outer peripheral surface of the first cylindrical portion; further comprising:

a cover member for covering the gear member, attached to the first cylindrical portion at the cut-out portion.

8. A dual-bearing reel unit as set forth in claim 1, wherein the second space accommodates a main gear mounted on a rotation shaft of the handle for transmitting rotation of the handle to the spool, and a pinion gear meshing with the main gear.

9. A dual-bearing reel unit as set forth in claim 1, wherein a rotation shaft of the handle is disposed in a portion where the first outer circumference overlaps the second outer circumference.

10. A dual-bearing reel unit as set forth in claim 9, wherein the second outer circumference is staggered toward the rotation shaft of the handle with respect to the first outer circumference.

11. A dual-bearing reel unit as set forth in claim 1, wherein the second cylindrical portion is staggered with respect to the first cylindrical portion toward the fishing-rod mount side and at the same time toward the side where fishing line is unwound from the spool.

12. A dual-bearing reel unit as set forth in claim 1 wherein the two cylindrical portions are covered only by the proximal side-cover.

13. For a dual-bearing fishing reel having side-plates flanking and rotatively supporting a spool cranked by a handle and side-covers covering each side-plate, a side-plate and side-cover configuration for the handle-mounting end of the reel, comprising:

a pair of complementary shells formed such that each includes at least a respective one of a pair of staggered crescent sections remaining from a pair of diametrically and axially staggered, intersecting cylinders less the region of intersection of the pair of cylinders; wherein staggered cylindrical surfaces of the pair of shells may be finished by turning on a lathe.

14. The side-plate and side-cover configuration as set forth in claim 13, the pair of intersecting cylinders each including one of cylindrically whole, opposite end sections each contiguous with one of the pair of crescent sections; wherein:

each of the pair of complementary shells includes an end section of one of the pair of intersecting cylinders, and a crescent section from the other.

15. The side-plate and side-cover configuration as set forth in claim 13, the pair of intersecting cylinders each including one of cylindrically whole, opposite end sections each contiguous with one of the pair of crescent sections; wherein:

each of the pair of complementary shells includes the end section and the crescent section forming one of the pair of intersecting cylinders.

16. The side-plate and side-cover configuration as set forth in claim 13, wherein each of the pair of intersecting cylinders has approximately the same diameter.

* * * * *